United States Patent [19]

Kablaoui

[11] 4,058,541

[45] Nov. 15, 1977

[54] PREPARATION OF 2-ALKANOYLOXY-ALKANOIC

[75] Inventor: Mahmoud S. Kablaoui, Wappingers Falls, N.Y.

[73] Assignee: Texaco Inc., New York, N.Y.

[21] Appl. No.: 733,634

[22] Filed: Oct. 18, 1976

[51] Int. Cl.$^2$ .............................. C09F 5/00; C11C 3/00
[52] U.S. Cl. ................................. 260/405; 260/410; 260/413; 260/535 R; 560/266
[58] Field of Search ............... 260/491, 488 F, 410, 260/410.9 D, 410.9 E, 405, 413, 535 R

[56] References Cited

U.S. PATENT DOCUMENTS

| 2,447,186 | 8/1948 | Gardner | 260/410.9 E |
|---|---|---|---|
| 3,551,465 | 12/1970 | Ellis | 260/410 |
| 3,732,283 | 5/1973 | Cummings | 260/488 F |
| 3,796,735 | 3/1974 | Duranlean et al. | 260/410 |

*Primary Examiner*—Winston A. Douglas
*Assistant Examiner*—John F. Niebling
*Attorney, Agent, or Firm*—Thomas H. Whaley; Carl G. Ries; George J. Darsa

[57] ABSTRACT

2-Alkanoyloxyalkanoic acids are prepared by contacting a nitroalkylnitrate or a nitroalcohol with an alkanoic acid in the presence of sulfuric acid.

9 Claims, No Drawings

PREPARATION OF 2-ALKANOYLOXY-ALKANOIC

BACKGROUND OF THE INVENTION

This invention relates to a method for preparing 2-alkanoyloxyalkanoic acids. In particular, this invention relates to a method of preparing 2-alkanoyloxyalkanoic acids from nitroalkylnitrates or nitroalcohols.

The preparation of 2-alkanoyloxyalkanoic acids may be undertaken by the steps of chlorinating, hydrolyzing and esterifying an alkanoic acid. Such a procedure for preparing 2-alkanoyloxyalkanoic acids is not particularly attractive inasmuch as it involves several steps resulting in many instances in low selectivities or yields of desired product. A method has now been found whereby individual or mixtures of 2-alkanoyloxyalkanoic acids can be prepared in good yields directly from nitronitrates or nitroalcohols.

It is therefore an object of this invention to provide a novel method for preparing 2-alkanoyloxyalkanoic acids.

Another object of this invention is to provide a method for preparing 2-alkanoyloxyalkanoic acids from nitronitrates or nitroalcohols.

Yet another object of this invention is to provide a method for preparing 2-alkanoyloxyalkanoic acids in good yields.

Other objects and advantages will become apparent from a reading of the following detailed description and examples.

SUMMARY OF THE INVENTION

Broadly, this invention contemplates a method of preparing a 2-alkanoyloxyalkanoic acid which comprises contacting a nitroalkylnitrate or a nitroalcohol with an alkanoic acid in the presence of sulfuric acid.

According to this invention, the contemplated 2-alkanoyloxyalkanoic acids are prepared from nitroalkylnitrates or nitroalcohols or mixtures thereof corresponding to the formula:

$$\text{R} - \underset{\underset{\text{OX}}{|}}{\text{CH}} - \text{CH}_2\text{NO}_2$$

where X is $NO_2$ or hydrogen and where R is an alkyl Group of from 1 to 50 carbon atoms, preferably 2 to 20 carbons.

More particularly, the nitroalkylnitrates employable in the instant process correspond to the formula:

$$\text{R} - \underset{\underset{\text{ONO}_2}{|}}{\text{CH}} - \text{CH}_2\text{NO}_2$$

where R is as described above. Illustrative of the nitroalkylnitrates I mention 1-nitro-2-butylnitrate, 1-nitro-2-pentylnitrate, 1-nitro-2-hexylnitrate, 1-nitro-2-octylnitrate, 1-nitro-2-decylnitrate, 1-nitro-2-dodecylnitrate, 1-nitro2-tetradecylnitrate and 1-nitro-2-hexadecylnitrate. The nitronitrates employable in the instant method typically can be formed by nitrooxidizing a 1-olefin at low temperatures followed by reduction with, for example, nitric oxide as described in U.S. Pat. No. 3,282,983.

Alternately, the nitroalcohols contemplated by this method correspond to the formula:

$$\text{R} - \underset{\underset{\text{OH}}{|}}{\text{CH}} - \text{CH}_2\text{NO}_2$$

where R is as described above. Typical nitroalcohols contemplated as reactants include 1-nitro-2-butanol, 1-nitro-2-pentanol, 1-nitro-2-hexanol, 1-nitro-2-heptanol, 1-nitro-2-octanol, 1-nitro-2-undecanol, 1-nitro-2-tridecanol, 1-nitro-2-tetradecanol and 1-nitro-2-hexadecanol. Mixtures of nitroalkylnitrates and nitroalcohols can also be employed as initial reactants and the mixture converted to 2-alkanoyloxyalkanoic acids according to this invention.

In particular, the present method comprises contacting the nitroalkylnitrate or nitroalcohol or mixtures thereof with an alkanoic acid in the presence of sulfuric acid. In the practice of the instant method concentrated or fuming sulfuric acid is employed, that is, acids of from 85 to 98 percent.

The alkanoic acid utilized in the instant method and reacted with the nitronitrate or nitroalcohol is one having from 2 to 20 carbon atoms. Illustrative of the alkanoic acids employed I mention acetic acid, propionic acid, butanoic acid, isobutanoic acid, pentanoic acid, hexanoic acid, octanoic acid, decanoic acid, undecanoic acid, dodecanoic acid, hexadecanoic acid, heptadecanoic acid, octadecanoic acid and eicosanoic acid. In general, the acids utilized in the present method correspond to the formula:

$$\text{R}^1\text{COOH}$$

where $R^1$ is an alkyl group of from 1 to 19 carbons.

More specifically, the instant method is further explained by the following equation:

$$\text{R}-\underset{\underset{\text{OX}}{|}}{\text{CH}}-\text{CH}_2\text{NO}_2 + \text{R}^1\text{COOH} \longrightarrow \text{R}-\underset{\underset{\text{O}-\text{C(O)R}^1}{|}}{\text{CH}}-\text{COOH}$$

where X, R and $R^1$ are as heretofore defined. In the practice of the method outlined above, it is essential that the reaction be conducted in the presence of sulfuric acid as more fully explained below. Nitronitrates or nitroalcohols have not been found to react with an alkanoic acid to form 2-alkanoyloxyalkanoic acids in the absence of sulfuric acid.

The method described herein is conducted at temperatures above about 100° C. and up to about 200° C., preferably from about 118° C. to 140° C. thereby forming the 2-alkanoyloxyalkanoic acid. It has been found that at temperatures up to about 100° C. no measurable amount of 2-alkanoyloxyalkanoic acid is formed. Instead the nitronitrate or nitroalcohol starting material are converted in the presence of sulfuric acid to 2-alkoxy-2-nitroalkanes. Undertaking the reaction at temperatures above 100° C. in accordance with the instant method, the 2-alkoxy-1-nitroalkane initially formed as an intermediate is in turn converted to a 2-alkanoyloxyalkanoic acid. To form significant and measurable amounts of 2-alkanoyloxyalkanoic acid product the reaction is conducted under the reaction conditions described herein for periods ranging of from about one-half to 24 hours. For example, after approximately 6 hours at 118° C. substantial amounts of 2-alkanoyloxyalkanoic acid are formed and after approximately 9 hours the principle product recoverable from the reaction is the desired 2-alkanoyloxyalkanoic acid. Continuing the reaction for longer periods of time substantially diminishes the presence of the intermediate 2-alkoxy-1-nitroalkane such that the product comprises 90 percent or higher 2-alkanoyloxyalkanoic acid.

In accordance with the method described herein the contacting of the reactants can be undertaken employing mole ratios of nitroalkylnitrate or nitroalcohol or mixtures thereof to alkanoic acid of between about 1:1 and 1:10. Mole ratios of nitroalkylnitrate or nitroalcohol or mixtures thereof of sulfuric acid of from about 1:1 to 1:3 are utilized. A significant aspect of the ratio of reactants is that the moles of alkanoic acid be at least equivalent and preferably in excess to the moles of nitrocompound reactant. The higher ratios of alkanoic acid are also preferred in that the acid functions not only as a reactant but additionally as the reaction medium. The contacting of the reactants is desirably carried out under conditons of agitation. If desired, an inert liquid diluent can also be present and may be desirable in those instances where the nitronitrate or nitroalcohol is viscous or solid at the reaction temperature. Suitable diluents, that is, those inert to the reaction, are those having a boiling point of at least 100° C. and up to about 250° C. including, for example, a wide range of $C_8$ to $C_{18}$ alkanes illustrated by octane, nonane, decane, dodecane, pentadecane and octadecane and alkyl benzenes such as toluene, xylene, ethylbenzene, isopropylbenzene, cyclohexylbenzene and phenylbenzene. The diluent, when employed, can be provided in amounts of from about 5 to 98 weight percent based on the weight of the charged nitrocompound. At the completion of the 2-alkanoyloxyalkanoic acid formation reaction, the acid product can be converted, if desired, to a 2-hydroxyalkanoic acid by contacting the product with water at temperatures of about 80° to 100° C.

As mentioned above, the instant method is conducted in the presence of concentrated sulfuric acid. Substitution of sulfuric acid with hydrochloric acid has been found to be inoperative in that no 2-alkanoyloxyalkanoic acid was formed and only the charged materials were recovered.

Specific examples of 2-alkanoyloxyalkanoic acids prepared according to this method include 2-acetoxypropionic acid, 2-acetoxybutanoic acid, 2-propoxypentanoic acid, 2-acetoxyhexanoic acid, 2-butoxyoctanoic acid, 2-acetoxydecanoic acid, 2-propoxydodecanoic acid, 2-acetoxytetradecanoic acid, 2-butoxyhexadecanoic acid, 2-acetoxy2-methylpropionic acid, 2-octatoxydecanoic acid, 2-dodecanoxyhexadecanoic acid and 2-octadecanoxytetradecanoic acid.

At the completion of the reaction, the 2-alkanoyloxyalkanoic acid can be recovered, for example, from the reaction mixture at about room temperature by diluting the mixture with water followed by extraction employing a nonpolar aprotic solvent, such as diethylether, carbon tetrachloride, chloroform or benzene. The aqueous layer contains sulfuric acid, unreacted lower molecular weight alkanoic acids when employed as initial reactants. The solvent layer after separation contains the 2-alkanoyloxyalkanoic acid. In those instances where a higher molecular weight alkanoic acid was initially employed, the solvent layer may also contain the same. Higher purities of 2-alkanoyloxyalkanoic acid can be recovered by distillation thereby removing solvent, any intermediate products and higher molecular weight alkanoic acids.

The 2-alkanoyloxyalkanoic acids prepared according to the instant method are useful as intermediates in the preparation of plasticizers by reaction with alkanols, for the preparation of alkenoic acids, such as acrylic acid and methacrylic acid, by pyrolysis of the alkoxy group or by hydrolysis and dehydration of the alkoxy group. Alkenoic acids are useful monomers for the preparation of such polymers as polyacrylates and polymethacrylates and alkenoic acids are additionally useful in such applications as pesticides, photographic compounds and weed killers. The 2-hydroxyalkanoic acids are likewise useful in preparing alkenoic acids and polymerization to polymers.

In order to more fully illustrate the nature of this invention and the manner of practicing the same the following examples are presented.

EXAMPLE 1

A mixture of 12.4 grams (0.05 mole) of 1-nitro-2-decylnitrate, 4.9 grams (0.05 mole) of concentrated sulfuric acid and 100 milliliters of acetic acid was heated to 100° C. Evolved nitrogen dioxide was detected. Analysis of a reaction mixture sample by gas chromatograph, infrared and nuclear magnetic resonance indicated complete conversion of the nitroalkylnitrate to 2-acetoxy-1-nitrodecane. After maintaining the mixture at 118° C. for nine hours, the reaction mixture was cooled to 15° C., the contents diluted with 200 milliliters of water, and the mixture extracted with four 75 milliliter portions of diethylether. The aqueous solution contained acetic acid and sulfuric acid. The ether solution was dried and stripped of ether by rotatory evaporation and 10.5 grams (approximately 90 percent yield) of product was recovered and identified by infrared and nuclear magnetic resonance as 2-acetoxydecanoic acid.

EXAMPLE 2

A mixture of 10.0 grams (0.05 mole) of 1-nitro-2-decanol, 4.9 grams of concentrated sulfuric acid (0.05 mole) and 100 milliliters of acetic acid was heated to 118° C. for eleven hours. In contrast to Example 1, no evolved nitrogen dioxide was detected. The reaction mixture was cooled to 15° C., the contents diluted with 200 milliliters of water and the solution extracted with 75 milliliter portions of diethylether as in Example 1. After drying and stripping the ether solution, 9.60 grams (approximately 90% yield) of product was recovered and identified by infrared and nuclear magnetic resonance as a mixture 2-acetoxydecanoic acid and 2-acetoxy-1-nitrodecane in approximately equal amounts.

EXAMPLE 3

To 12.4 grams (0.05 mole) of 1-nitro-2-decylnitrate there was added 100 milliliters of acetic acid. The mixture was heated to 118° C. for 9 hours. The reaction mixture was cooled to 15° C., 200 milliliters water added and the solution extracted with four 100 milliliter portions of diethylether. After drying and stripping the ether solution, analysis of the recovered product indicated it to be greater than 95 percent of the starting material.

EXAMPLE 4

To 12.4 grams (0.05 mole) of 1-nitro-2-decylnitrate there was added 100 milliliters of acetic acid and 5.0 grams (0.05 mole) of concentrated hydrochloric acid (37.5% solution in water). After heating for 9 hours at about 118° C., the reaction was cooled to 15° C., the product extracted and recovered as in Example 3. Analysis of the recovered product indicated it to be the starting material.

I claim:

1. A method of preparing a 2-alkanoyloxyalkanoic acid which comprises contacting a nitroalkylnitrate or a nitroalcohol or mixtures thereof corresponding to the formula:

where X is $NO_2$ or hydrogen and where R is an alkyl group of from 1 to 50 carbon atoms with an alkanoic acid having from 2 to 20 carbon atoms in the presence of sulfuric acid at a temperature of from above about 100° C. and up to about 200° C. employing mole ratios of nitroalkylnitrate or nitroalcohol to alkanoic acid of between 1:1 and 1:10.

2. A method according to claim 1 wherein said temperature is from about 118° C. to 140° C.

3. A method according to claim 1 wherein a mixture of nitroalkylnitrate and nitroalcohol is employed.

4. A method according to claim 1 wherein the mole ratio of nitroalkylnitrate or nitroalcohol to sulfuric acid is from about 1:1 to 1:3.

5. A method according to claim 1 wherein said alkanoic acid is acetic acid.

6. A method according to claim 1 wherein said nitroalkylnitrate is 1-nitro-2-decylnitrate.

7. A method according to claim 1 wherein said nitroalcohol is 1-nitro-2-decanol.

8. A method according to claim 1 wherein said 2-alkanoyloxyalkanoic acid is 2-acetoxydecanoic acid.

9. A method according to claim 1 wherein said 2-alkanoyloxyalkanoic acid is thereafter contacted with water at from about 80° to 100° C. forming a 2-hydroxyalkanoic acid.

* * * * *